US008439398B2

(12) United States Patent
Baca (10) Patent No.: US 8,439,398 B2
(45) Date of Patent: May 14, 2013

(54) INFLATOR CONNECTORS FOR INFLATABLE PERSONAL RESTRAINTS AND ASSOCIATED SYSTEMS AND METHODS

(75) Inventor: Andre Baca, Laveen, AZ (US)

(73) Assignee: AmSafe, Inc., Phoenix, AZ (US)

( * ) Notice: Subject to any disclaimer, the term of this patent is extended or adjusted under 35 U.S.C. 154(b) by 0 days.

(21) Appl. No.: 13/194,411

(22) Filed: Jul. 29, 2011

(65) Prior Publication Data

US 2013/0026743 A1    Jan. 31, 2013

(51) Int. Cl.
*B60R 21/18* (2006.01)

(52) U.S. Cl.
USPC .......................................................... 280/733

(58) Field of Classification Search .................... 280/733
See application file for complete search history.

(56) References Cited

U.S. PATENT DOCUMENTS

| | | | |
|---|---|---|---|
| 2,502,206 | A | 3/1950 | Creek |
| 3,430,979 | A | 3/1969 | Terry et al. |
| 3,560,027 | A | 2/1971 | Graham |
| 3,682,498 | A | 8/1972 | Rutzki |
| 3,706,463 | A | 12/1972 | Lipkin |
| 3,730,583 | A | 5/1973 | Colovas et al. |
| 3,756,620 | A | 9/1973 | Radke |
| 3,766,612 | A | 10/1973 | Hattori |
| 3,801,156 | A | 4/1974 | Cranig |
| 3,820,842 | A | 6/1974 | Stephenson |
| 3,841,654 | A | 10/1974 | Lewis |
| 3,865,398 | A | 2/1975 | Woll |
| 3,866,940 | A | 2/1975 | Lewis |
| 3,888,503 | A | 6/1975 | Hamilton |
| 3,897,081 | A | 7/1975 | Lewis |
| 3,905,615 | A | 9/1975 | Schulman |
| 3,933,370 | A | 1/1976 | Abe et al. |
| 3,948,541 | A | 4/1976 | Schulman |
| 3,970,329 | A | 7/1976 | Lewis |
| 3,971,569 | A | 7/1976 | Abe et al. |
| 4,107,604 | A | 8/1978 | Bernier |

(Continued)

FOREIGN PATENT DOCUMENTS

| | | |
|---|---|---|
| DE | 4116162 | 11/1992 |
| DE | 19742151 | 4/1998 |

(Continued)

OTHER PUBLICATIONS

International Search Report and Written Opinion; International Patent Application No. PCT/US2011/048987 ; Filed: Aug. 24, 2011; Applicant: AmSafe, Inc.; Mailed on Jan. 31, 2012.

(Continued)

*Primary Examiner* — Faye M. Fleming
(74) *Attorney, Agent, or Firm* — Perkins Coie LLP (57) ABSTRACT

Inflator connectors for inflatable personal restraints and associated systems and methods are described herein. An inflator connector configured in accordance with an embodiment of the present technology, for example, can include a body having an attachment portion and a sleeve portion and a coupling rotatably received in the sleeve portion. The attachment portion of the body can include a first bore having a first engagement feature positioned toward a first opening for operably engaging at least one of an inflator and a gas tube. The sleeve portion can include a second bore in fluid communication with the first bore. The coupling can include a second engagement feature positioned toward a second opening for operably engaging the other of the inflator and the gas tube.

19 Claims, 6 Drawing Sheets

U.S. PATENT DOCUMENTS

| | | | |
|---|---|---|---|
| 4,437,628 A | 3/1984 | Schwartz |
| 4,565,535 A | 1/1986 | Tassy |
| 4,611,491 A | 9/1986 | Brown et al. |
| 4,657,516 A | 4/1987 | Tassy |
| 4,722,573 A | 2/1988 | Komohara |
| 4,765,569 A | 8/1988 | Higgins |
| 4,842,299 A | 6/1989 | Okamura et al. |
| 4,971,354 A | 11/1990 | Kim |
| 4,987,783 A | 1/1991 | D'Antonio et al. |
| 4,995,638 A | 2/1991 | Shinto et al. |
| 4,995,640 A | 2/1991 | Saito |
| 5,026,305 A | 6/1991 | Del Guidice et al. |
| 5,062,662 A | 11/1991 | Cameron |
| 5,062,663 A | 11/1991 | Satoh |
| 5,161,821 A | 11/1992 | Curtis |
| 5,162,006 A | 11/1992 | Yandle |
| 5,183,288 A | 2/1993 | Inada et al. |
| 5,184,844 A | 2/1993 | Goor |
| 5,194,755 A | 3/1993 | Rhee et al. |
| 5,199,739 A | 4/1993 | Fujiwara |
| 5,288,104 A | 2/1994 | Chen |
| 5,299,827 A | 4/1994 | Igawa |
| 5,324,071 A | 6/1994 | Gotomyo et al. |
| 5,335,937 A | 8/1994 | Uphues et al. |
| 5,335,939 A | 8/1994 | Kuriyama et al. |
| 5,375,875 A | 12/1994 | DiSalvo et al. |
| 5,400,867 A | 3/1995 | Muller et al. |
| 5,411,289 A | 5/1995 | Smith et al. |
| 5,456,491 A | 10/1995 | Chen et al. |
| 5,465,999 A | 11/1995 | Tanaka et al. |
| 5,470,103 A | 11/1995 | Vaillancourt et al. |
| 5,472,231 A | 12/1995 | France |
| 5,473,111 A | 12/1995 | Hattori et al. |
| 5,485,041 A | 1/1996 | Meister |
| 5,492,360 A | 2/1996 | Logeman |
| 5,499,840 A | 3/1996 | Nakano |
| 5,597,178 A | 1/1997 | Hardin, Jr. |
| 5,609,363 A | 3/1997 | Finelli |
| 5,672,916 A | 9/1997 | Mattes et al. |
| 5,734,318 A | 3/1998 | Nitschke et al. |
| 5,752,714 A | 5/1998 | Pripps et al. |
| 5,758,900 A | 6/1998 | Knoll et al. |
| 5,765,869 A | 6/1998 | Huber |
| 5,772,238 A | 6/1998 | Breed et al. |
| 5,803,489 A | 9/1998 | Nusshor |
| 5,839,753 A | 11/1998 | Yaniv et al. |
| 5,851,055 A | 12/1998 | Lewis |
| 5,863,065 A | 1/1999 | Boydston et al. |
| 5,868,421 A | 2/1999 | Eyrainer |
| 5,871,230 A | 2/1999 | Lewis |
| 5,886,373 A | 3/1999 | Hosogi |
| 5,906,391 A | 5/1999 | Weir et al. |
| 5,924,726 A | 7/1999 | Pan |
| 5,927,748 A | 7/1999 | O'Driscoll |
| 5,927,754 A | 7/1999 | Patzelt et al. |
| 5,947,513 A | 9/1999 | Lehto |
| 5,975,565 A | 11/1999 | Cuevas |
| 5,984,350 A | 11/1999 | Hagan et al. |
| 5,988,438 A | 11/1999 | Lewis et al. |
| RE36,587 E | 2/2000 | Tanaka et al. |
| 6,019,388 A | 2/2000 | Okazaki et al. |
| 6,042,139 A | 3/2000 | Knox |
| RE36,661 E | 4/2000 | Tanaka et al. |
| 6,059,312 A | 5/2000 | Staub et al. |
| 6,065,772 A | 5/2000 | Yamamoto et al. |
| 6,082,763 A | 7/2000 | Kokeguchi |
| 6,113,132 A | 9/2000 | Saslecov |
| 6,126,194 A | 10/2000 | Yaniv et al. |
| 6,135,489 A | 10/2000 | Bowers |
| 6,142,508 A | 11/2000 | Lewis |
| 6,142,511 A | 11/2000 | Lewis |
| 6,155,598 A | 12/2000 | Kutchey |
| 6,158,765 A | 12/2000 | Sinnhuber |
| 6,168,195 B1 | 1/2001 | Okazaki et al. |
| 6,224,097 B1 | 5/2001 | Lewis |
| 6,254,121 B1 | 7/2001 | Fowler et al. |
| 6,260,572 B1 | 7/2001 | Wu |
| 6,276,714 B1 | 8/2001 | Yoshioka |
| 6,293,582 B1 | 9/2001 | Lewis |
| 6,325,412 B1 | 12/2001 | Pan |
| 6,336,657 B1 | 1/2002 | Akaba et al. |
| 6,378,898 B1 | 4/2002 | Lewis et al. |
| 6,382,666 B1 | 5/2002 | Devonport |
| 6,390,502 B1 | 5/2002 | Ryan et al. |
| 6,406,058 B1 | 6/2002 | Devonport et al. |
| 6,419,263 B1 | 7/2002 | Busgen et al. |
| 6,425,601 B1 | 7/2002 | Lewis |
| 6,439,600 B1 | 8/2002 | Adkisson |
| 6,442,807 B1 | 9/2002 | Adkisson |
| 6,443,496 B2 | 9/2002 | Campau |
| 6,460,878 B2 | 10/2002 | Eckert et al. |
| 6,547,273 B2 | 4/2003 | Grace et al. |
| 6,557,887 B2 | 5/2003 | Wohllebe |
| 6,585,289 B1 | 7/2003 | Hammer et al. |
| 6,616,177 B2 | 9/2003 | Thomas et al. |
| 6,648,367 B2 | 11/2003 | Breed et al. |
| 6,688,642 B2 | 2/2004 | Sollars, Jr. |
| 6,705,641 B2 | 3/2004 | Schneider et al. |
| 6,729,643 B1 | 5/2004 | Bassick et al. |
| 6,739,264 B1 | 5/2004 | Hosey et al. |
| 6,746,074 B1 | 6/2004 | Kempf et al. |
| 6,749,220 B1 | 6/2004 | Wipasuramonton et al. |
| 6,758,489 B2 | 7/2004 | Xu |
| 6,764,097 B2 | 7/2004 | Kelley et al. |
| 6,769,714 B2 | 8/2004 | Hosey et al. |
| 6,776,434 B2 | 8/2004 | Ford et al. |
| 6,779,813 B2 | 8/2004 | Lincoln |
| 6,789,818 B2 | 9/2004 | Gioutsos et al. |
| 6,789,819 B1 | 9/2004 | Husby |
| 6,789,821 B2 | 9/2004 | Zink et al. |
| 6,793,243 B2 | 9/2004 | Husby |
| 6,796,578 B2 | 9/2004 | White et al. |
| 6,802,527 B2 | 10/2004 | Schmidt et al. |
| 6,802,530 B2 | 10/2004 | Wipasuramonton et al. |
| 6,808,198 B2 | 10/2004 | Schneider et al. |
| 6,823,645 B2 | 11/2004 | Ford |
| 6,824,163 B2 | 11/2004 | Sen et al. |
| 6,825,654 B2 | 11/2004 | Pettypiece, Jr. et al. |
| 6,830,263 B2 | 12/2004 | Xu et al. |
| 6,830,265 B2 | 12/2004 | Ford |
| 6,837,079 B1 | 1/2005 | Takeuchi |
| 6,838,870 B2 | 1/2005 | Pettypiece, Jr. et al. |
| 6,840,534 B2 | 1/2005 | Lincoln et al. |
| 6,840,537 B2 | 1/2005 | Xu et al. |
| 6,840,539 B2 | 1/2005 | Pettypiece, Jr. |
| 6,843,503 B2 | 1/2005 | Ford |
| 6,846,005 B2 | 1/2005 | Ford et al. |
| 6,851,374 B1 | 2/2005 | Kelley et al. |
| 6,857,657 B2 | 2/2005 | Canterberry et al. |
| 6,860,509 B2 | 3/2005 | Xu et al. |
| 6,863,301 B2 | 3/2005 | Ford et al. |
| 6,869,101 B2 | 3/2005 | White et al. |
| 6,871,872 B2 | 3/2005 | Thomas |
| 6,871,874 B2 | 3/2005 | Husby et al. |
| 6,874,814 B2 | 4/2005 | Hosey et al. |
| 6,882,914 B2 | 4/2005 | Gioutsos et al. |
| 6,886,856 B2 | 5/2005 | Canterberry et al. |
| 6,886,858 B2 | 5/2005 | Olson |
| 6,887,325 B2 | 5/2005 | Canterberry et al. |
| 6,894,483 B2 | 5/2005 | Pettypiece, Jr. et al. |
| 6,905,134 B2 | 6/2005 | Saiguchi et al. |
| 6,908,104 B2 | 6/2005 | Canterberry et al. |
| 6,923,483 B2 | 8/2005 | Curry et al. |
| 6,929,283 B2 | 8/2005 | Gioutsos et al. |
| 6,932,378 B2 | 8/2005 | Thomas |
| 6,942,244 B2 | 9/2005 | Roychoudhury |
| 6,951,350 B2 | 10/2005 | Heidorn et al. |
| 6,951,532 B2 | 10/2005 | Ford |
| 6,953,204 B2 | 10/2005 | Xu et al. |
| 6,955,377 B2 | 10/2005 | Cooper et al. |
| 6,957,828 B2 | 10/2005 | Keeslar et al. |
| 6,962,363 B2 | 11/2005 | Wang et al. |
| 6,962,364 B2 | 11/2005 | Ju et al. |
| 6,974,154 B2 | 12/2005 | Grossert et al. |
| 6,983,956 B2 | 1/2006 | Canterberry et al. |
| 6,994,372 B2 | 2/2006 | Ford et al. |
| 7,007,973 B2 | 3/2006 | Canterberry et al. |

| Patent No. | Date | Inventor(s) |
|---|---|---|
| 7,021,653 B2 | 4/2006 | Burdock et al. |
| 7,029,024 B2 | 4/2006 | Baumbach |
| 7,036,844 B2 | 5/2006 | Hammer et al. |
| 7,044,500 B2 | 5/2006 | Kalandek et al. |
| 7,044,502 B2 | 5/2006 | Trevillyan et al. |
| 7,048,298 B2 | 5/2006 | Arwood et al. |
| 7,052,034 B2 | 5/2006 | Lochmann |
| 7,055,856 B2 | 6/2006 | Ford et al. |
| 7,063,350 B2 | 6/2006 | Steimke et al. |
| 7,070,203 B2 | 7/2006 | Fisher et al. |
| 7,081,692 B2 | 7/2006 | Pettypiece, Jr. et al. |
| 7,090,246 B2 | 8/2006 | Lincoln et al. |
| 7,107,133 B2 | 9/2006 | Fisher et al. |
| 7,121,581 B2 | 10/2006 | Xu et al. |
| 7,121,628 B2 | 10/2006 | Lo |
| 7,131,662 B2 | 11/2006 | Fisher et al. |
| 7,131,664 B1 | 11/2006 | Pang et al. |
| 7,147,245 B2 | 12/2006 | Florsheimer et al. |
| 7,152,880 B1 | 12/2006 | Pang et al. |
| 7,163,236 B2 | 1/2007 | Masuda et al. |
| 7,198,285 B2 | 4/2007 | Hochstein-Lenzen |
| 7,198,293 B2 | 4/2007 | Olson |
| 7,213,836 B2 | 5/2007 | Coon et al. |
| 7,216,891 B2 | 5/2007 | Biglino |
| 7,216,892 B2 | 5/2007 | Baumbach et al. |
| 7,222,877 B2 | 5/2007 | Wipasuramonton et al. |
| 7,255,364 B2 | 8/2007 | Bonam et al. |
| 7,261,315 B2 | 8/2007 | Hofmann et al. |
| 7,261,316 B1 | 8/2007 | Salmo et al. |
| 7,264,269 B2 | 9/2007 | Gu et al. |
| 7,267,361 B2 | 9/2007 | Hofmann et al. |
| 7,270,344 B2 | 9/2007 | Schirholz et al. |
| 7,278,656 B1 | 10/2007 | Kalandek |
| 7,281,733 B2 | 10/2007 | Pieruch |
| 7,303,206 B2 | 12/2007 | Kippschull et al. |
| 7,318,599 B2 | 1/2008 | Magdun |
| 7,320,479 B2 | 1/2008 | Trevillyan et al. |
| 7,325,829 B2 | 2/2008 | Kelley et al. |
| 7,341,276 B2 | 3/2008 | Kelley et al. |
| 7,347,449 B2 | 3/2008 | Rossbach et al. |
| 7,350,806 B2 | 4/2008 | Ridolfi et al. |
| 7,354,064 B2 | 4/2008 | Block et al. |
| 7,367,590 B2 | 5/2008 | Koning et al. |
| 7,380,817 B2 | 6/2008 | Poli et al. |
| 7,390,018 B2 | 6/2008 | Ridolfi et al. |
| 7,398,994 B2 | 7/2008 | Poli et al. |
| 7,401,805 B2 | 7/2008 | Coon et al. |
| 7,401,808 B2 | 7/2008 | Rossbach et al. |
| 7,404,572 B2 | 7/2008 | Salmo et al. |
| 7,407,183 B2 | 8/2008 | Ford et al. |
| 7,431,332 B2 | 10/2008 | Wipasuramonton et al. |
| 7,452,002 B2 | 11/2008 | Baumbach et al. |
| 7,506,891 B2 | 3/2009 | Quioc et al. |
| 7,513,524 B2 | 4/2009 | Oota et al. |
| 7,533,897 B1 | 5/2009 | Xu et al. |
| 7,625,008 B2 | 12/2009 | Pang et al. |
| 7,658,400 B2 | 2/2010 | Wipasuramonton et al. |
| 7,658,406 B2 | 2/2010 | Townsend et al. |
| 7,658,407 B2 | 2/2010 | Ford et al. |
| 7,658,409 B2 | 2/2010 | Ford et al. |
| 7,661,697 B2 | 2/2010 | Itoga |
| 7,665,761 B1 | 2/2010 | Green et al. |
| 7,703,796 B2 | 4/2010 | Manire et al. |
| 7,708,312 B2 | 5/2010 | Kalandek |
| 7,753,402 B2 | 7/2010 | Volkmann et al. |
| 7,789,418 B2 | 9/2010 | Wipasuramonton et al. |
| 7,883,106 B2 | 2/2011 | Mical |
| 7,980,590 B2 * | 7/2011 | Foubert et al. ................ 280/733 |
| 2001/0028161 A1 | 10/2001 | Hoagland |
| 2001/0048215 A1 | 12/2001 | Breed et al. |
| 2002/0011723 A1 | 1/2002 | Lewis |
| 2002/0024200 A1 | 2/2002 | Eckert et al. |
| 2002/0067031 A1 | 6/2002 | Busgen et al. |
| 2002/0101067 A1 | 8/2002 | Breed |
| 2002/0125700 A1 | 9/2002 | Adkisson |
| 2002/0125701 A1 | 9/2002 | Devonport |
| 2002/0140209 A1 | 10/2002 | Waid et al. |
| 2003/0168837 A1 | 9/2003 | Schneider et al. |
| 2004/0164532 A1 | 8/2004 | Heidorn et al. |
| 2004/0178614 A1 | 9/2004 | Countryman et al. |
| 2004/0188988 A1 | 9/2004 | Wipasuramonton et al. |
| 2005/0006884 A1 | 1/2005 | Cooper et al. |
| 2005/0146119 A1 | 7/2005 | Ford et al. |
| 2005/0212270 A1 | 9/2005 | Wipasuramonton et al. |
| 2005/0218635 A1 | 10/2005 | Wipasuramonton et al. |
| 2005/0248135 A1 | 11/2005 | Poli et al. |
| 2006/0108775 A1 | 5/2006 | Schirholz et al. |
| 2006/0119084 A1 | 6/2006 | Coon et al. |
| 2006/0175816 A1 | 8/2006 | Spencer et al. |
| 2006/0186644 A1 | 8/2006 | Manire et al. |
| 2006/0220360 A1 | 10/2006 | Ridolfi et al. |
| 2006/0255570 A1 | 11/2006 | Wipasuramonton et al. |
| 2006/0282203 A1 | 12/2006 | Hasebe et al. |
| 2007/0001435 A1 | 1/2007 | Gray et al. |
| 2007/0001437 A1 | 1/2007 | Wall et al. |
| 2007/0013175 A1 | 1/2007 | Suyama et al. |
| 2007/0075534 A1 | 4/2007 | Kelley et al. |
| 2007/0075535 A1 | 4/2007 | Trevillyan et al. |
| 2007/0075536 A1 | 4/2007 | Kelley et al. |
| 2007/0080528 A1 | 4/2007 | Itoga et al. |
| 2007/0085309 A1 | 4/2007 | Kelley et al. |
| 2007/0108753 A1 | 5/2007 | Pang et al. |
| 2007/0138775 A1 | 6/2007 | Rossbach et al. |
| 2007/0138776 A1 | 6/2007 | Rossbach et al. |
| 2007/0152428 A1 | 7/2007 | Poli et al. |
| 2007/0182137 A1 | 8/2007 | Hiroshige et al. |
| 2007/0200329 A1 | 8/2007 | Ma |
| 2007/0222189 A1 | 9/2007 | Baumbach et al. |
| 2007/0241223 A1 | 10/2007 | Boelstler et al. |
| 2008/0018086 A1 | 1/2008 | Ford et al. |
| 2008/0054602 A1 | 3/2008 | Yang |
| 2008/0084050 A1 | 4/2008 | Volkmann et al. |
| 2008/0088118 A1 | 4/2008 | Wipasuramonton et al. |
| 2008/0106074 A1 | 5/2008 | Ford |
| 2009/0020032 A1 | 1/2009 | Trevillyan |
| 2009/0020197 A1 | 1/2009 | Hosey |
| 2009/0051149 A1 | 2/2009 | Kalandek et al. |
| 2009/0051150 A1 | 2/2009 | Murakami |
| 2009/0058052 A1 | 3/2009 | Ford et al. |
| 2009/0236828 A1 | 9/2009 | Foubert |
| 2010/0066060 A1 | 3/2010 | Kalandek |
| 2010/0115737 A1 | 5/2010 | Foubert |
| 2010/0164208 A1 | 7/2010 | Kalandek |
| 2012/0256403 A1 | 10/2012 | Shields |
| 2012/0261911 A1 | 10/2012 | Baca |

FOREIGN PATENT DOCUMENTS

| | | |
|---|---|---|
| DE | 4211209 | 10/1998 |
| DE | 10041042 | 5/2001 |
| EP | 0639481 | 2/1995 |
| EP | 0765780 | 4/1997 |
| EP | 1101660 | 5/2001 |
| EP | 2028103 | 2/2009 |
| FR | 2703011 | 9/1994 |
| GB | 2306876 | 5/1997 |
| GB | 2368050 | 4/2002 |
| GB | 2410009 | 7/2005 |
| JP | 63258239 | 10/1988 |
| JP | 1083436 | 3/1989 |
| JP | 11189117 | 7/1999 |
| WO | WO88/07947 | 10/1988 |
| WO | WO99/39940 | 8/1999 |
| WO | WO99/42336 | 8/1999 |
| WO | WO01/00456 | 1/2001 |
| WO | WO01/68413 | 9/2001 |

OTHER PUBLICATIONS

"Takata Melds Air Bag with Seat Belt," The Japan Times, Nov. 27, 2010, 1 page.

* cited by examiner

Fig. 4

INFLATOR CONNECTORS FOR INFLATABLE PERSONAL RESTRAINTS AND ASSOCIATED SYSTEMS AND METHODS

TECHNICAL FIELD

The following disclosure relates generally to inflator connectors for inflatable personal restraint systems and associated systems and methods.

BACKGROUND

Airbags can protect vehicle occupants during accidents. In cars, for example, airbags generally deploy from the steering column, dashboard, side panel, and/or other stationary location to protect the driver and/or other occupant(s). During a sudden deceleration of the car (e.g., a collision), the airbag rapidly inflates with compressed air or other gases, and deploys in front of or to the side of the occupant(s). An airbag positioned in the steering column, for example, can expand in front of the driver to cushion his torso and head. The airbag can prevent the driver's head from hitting the steering wheel, and can also reduce the likelihood of whiplash.

Although airbags that deploy from stationary locations (e.g., the steering column) are common in automobiles, they may not be as effective in other types of vehicles or for other seating arrangements. Seats in commercial passenger aircraft, for example, can be configured in a variety of different cabin layouts to provide more or less space between succeeding rows. Additionally, seat backs in aircraft may rotate forward and downward during crash events, and thus may be unsuitable for airbag storage. As a result, airbags have been developed that deploy from seat belts to accommodate occupants in aircraft and other vehicles. Such airbags can deploy from, for example, a lap belt and/or a shoulder belt to provide protection during a sudden deceleration event.

Some airbag systems include an inflator that stores compressed gas (e.g., air) for inflating the airbag. Other airbag systems include gas-generator inflators. In a seatbelt-deployable airbag, the inflator is typically connected to the airbag by a hose that is coupled to an outlet on the inflator. The inflator can include a pyrotechnic device that initiates the release of the compressed gas from the inflator in response to a rapid deceleration event, such as a crash.

DETAILED DESCRIPTION

The present disclosure describes inflator connectors for inflatable personal restraint systems and associated systems and methods. An inflator connector configured in accordance with an embodiment of the present technology includes a rotatable coupling that can facilitate alignment of the inflator connector with various orientations of threads on an inflator and on a tube that delivers gas to an airbag. Certain details are set forth in the following description and in FIGS. 1-4 to provide a thorough understanding of various embodiments of the disclosure. Other details describing well-known structures and systems often associated with airbags, inflators, restraint systems, etc., have not been set forth below to avoid unnecessarily obscuring the description of the various embodiments of the disclosure.

Many of the details, dimensions, angles and other features shown in FIGS. 1-4 are merely illustrative of particular embodiments of the disclosure. Accordingly, other embodiments can add other details, dimensions, angles and features without departing from the spirit or scope of the present technology. In addition, those of ordinary skill in the art will appreciate that further embodiments of the technology can be practiced without several of the details described below.

Figure 1:
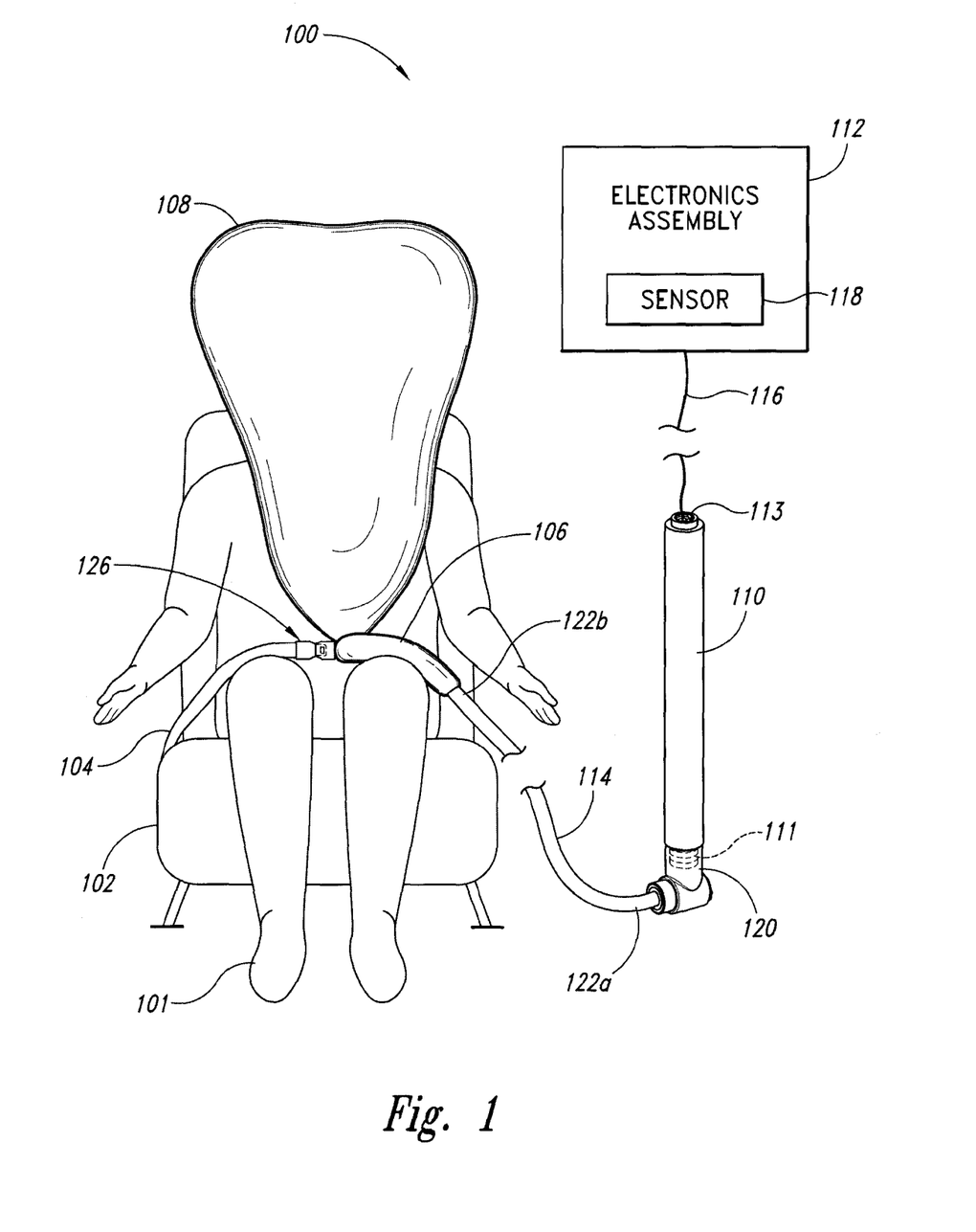
FIG. 1 is a partially schematic front view of an inflatable personal restraint system having an inflator connector configured in accordance with an embodiment of the present technology.

FIG. 1 is a partially schematic front view of an occupant 101 secured in a seat 102 by an inflatable personal restraint system 100 ("restraint system 100") configured in accordance with an embodiment of the present technology. The seat 102 and the restraint system 100 can be used in a variety of vehicles, such as aircraft, ground vehicles (e.g., automobiles, military vehicles, etc.), watercraft, spacecraft, etc. In one embodiment, for example, the restraint system 100 can be used in a commercial or private aircraft. The restraint system 100 can include one or more belts or webs 104 extending around the occupant 101 and connected to each other with a buckle assembly 126. As used herein, "webs" can refer to any type of flexible strap or belt, such as seat belts made from a woven material (e.g., nylon). In the illustrated embodiment, the restraint system 100 includes lap webs 104 that extend around the occupant's waist. In other embodiments, the restraint system 100 can include additional webs, such as shoulder webs that extend across the occupant's torso and/or crotch webs that extend between the occupant's legs.

In the illustrated embodiment, at least one of the webs 104 includes a web cover 106 that encloses and retains an airbag 108 in its uninflated state. The airbag 108 is shown in the inflated state in FIG. 1 after it has been deployed from the web cover 106. When the airbag 108 is not inflated, it can be rolled, folded, stuffed, or otherwise contained in the web cover 106 such that the web 104 has a generally similar appearance as a conventional seat belt with padding.

The restraint system 100 can further include at least one gas source or inflator 110 that includes a gas outlet 111 and an electrical port 113. The inflator 110 can include a canister, cylinder, and/or other container filled with a substantially inert compressed gas (e.g., air, nitrogen, helium, argon, etc.). As explained in greater detail below, the gas can be released via the gas outlet 111 by a spike in internal pressure caused by a pyrotechnic, electric, or other initiation device (not shown) that is activated via an electrical signal during a rapid deceleration or similar dynamic event (e.g., an impact, collision, acceleration, etc.). In other embodiments, the inflator 110 can include a propellant-based gas generating device and/or other gas sources suitable for airbag inflation.

As shown in FIG. 1, a first end portion 122a of a gas conduit or tube 114 can be operably coupled to the gas outlet 111 by an inflator connector 120 ("connector 120"). As described in further detail below, the connector 120 can ease assembly and installation of the restraint system 100 and facilitate the gas and electrical connections of the inflator 110 by providing the correct orientation for attachment of the gas tube 114, and by allowing the gas tube 114 to swivel or rotate relative to the inflator 110. A second end portion 122b of the gas tube 114 can be operably connected to the airbag 108 such that gas can flow from the inflator 110 to the airbag 108 during deployment. The gas tube 114 can be a flexible fabric hose made from the same material as the airbag 108 (e.g., nylon). In other embodiments, the gas tube 114 can be made from other suitable materials, such as Kevlar, polyurethane, etc. that can provide a gas flow path from the inflator 110 to the airbag 108.

The inflator electrical port 113 can be operably coupled to an electronics assembly 112 (e.g., an electronics module assembly ("EMA"); shown schematically) via an electrical link 116 (e.g., a wire, electrical line, retractile cord, connector, etc.). The electronics assembly 112 can include a sensor 118 (e.g., a crash sensor, shown schematically) and associated devices configured to detect a rapid deceleration event above a preset magnitude, and transmit a corresponding signal to the inflator 110 via the electrical link 116 to initiate deployment of the airbag 108. In other embodiments, the sensor 118 can be configured to detect other types of dynamic events, and transmit a corresponding signal to the inflator 110 in response to the sensed dynamic events.

The restraint system 100 secures the occupant 101 in the seat 102, and protects the occupant 101 during a crash, rapid deceleration event, or other type of dynamic event. Upon detection of such an event, the electronics assembly 112 can transmit a signal to the inflator 110 via the electrical link 116 to release the compressed gas stored within the inflator 110. The gas from the inflator 110 flows rapidly through the gas tube 114 into the airbag 108. As shown in FIG. 1, the airbag 108 can deploy in front of the occupant 101 from the lap web 104 to provide forward impact protection. In other embodiments, the airbag 108 can deploy from other webs 104 (e.g., shoulder webs) and/or provide impact protection from different angles (e.g., side impact protection). The seat belt-deployable airbag 108 of FIG. 1 secures the air bag 108 in front of the occupant 101, and may be of particular use when incorporated into aircraft and other vehicles with movable seat backs and/or different seating arrangements.

Figures 2A, 2B:
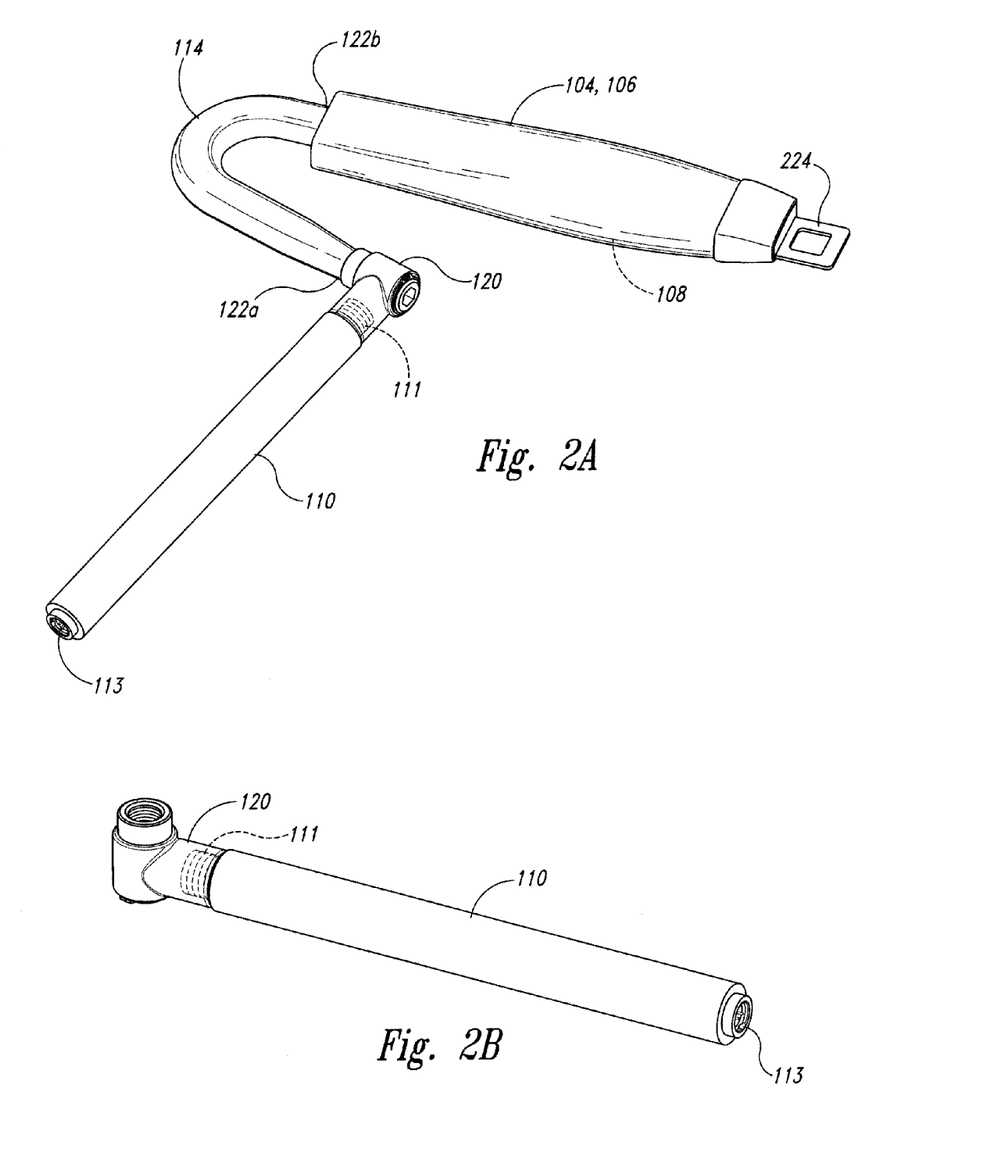
FIGS. 2A and 2B are isometric views of portions of the inflatable personal restraint system of FIG. 1.

FIGS. 2A and 2B are isometric views of portions of the restraint system 100 of FIG. 1. More specifically, FIG. 2A illustrates an arrangement of the gas tube 114, the inflator 110, and the airbag 108 stored within the airbag cover 106. FIG. 2B is an isometric view of the connector 120 coupled to the inflator 110. The gas tube 114 is illustrated in FIG. 2A as an expanded conduit similar in shape to the shape the gas tube 114 may take during airbag deployment. During normal operation, however, the gas tube 114 can be deflated such that it is substantially flat. In the illustrated embodiment, the airbag 108 is positioned on a portion of the web 104 that carries a buckle connector 224 (e.g., a tongue) of the buckle assembly 126 (FIG. 1). In other embodiments, the airbag 108 can be positioned on the opposing web 104 that carries the corresponding buckle (not shown) of the buckle assembly 126. In other embodiments, the airbag can be positioned on other portions of the restraint system 100.

In the illustrated embodiment, the connector 120 attaches directly between the inflator 110 and the gas tube 114. In other embodiments, however, intermediate fittings, couplings, and/or others parts can be installed between the connector 120 and the inflator 110 and/or between the connector 120 and the gas tube 114.

Figure 3A:
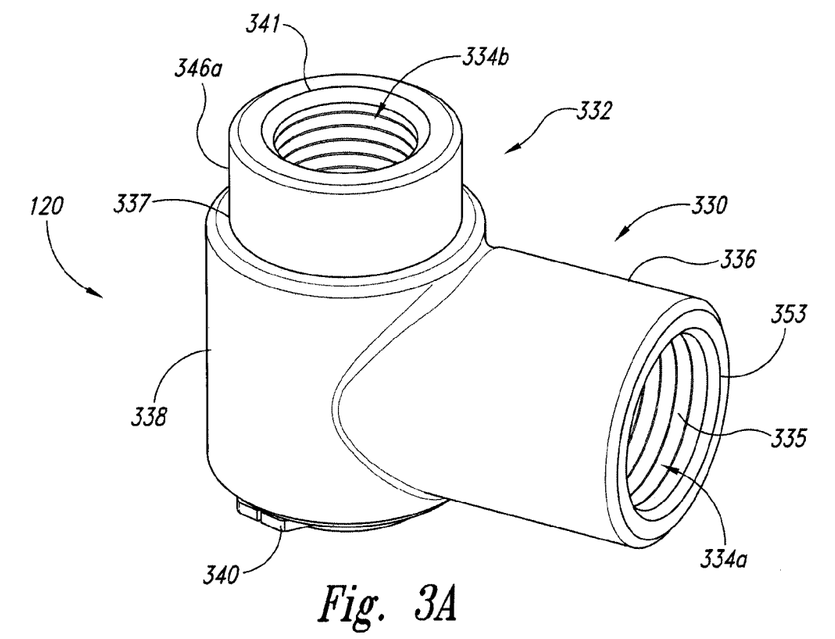
FIGS. 3A and 3B are enlarged isometric views of an inflator connector configured in accordance with an embodiment of the present technology.
Figure 3B:
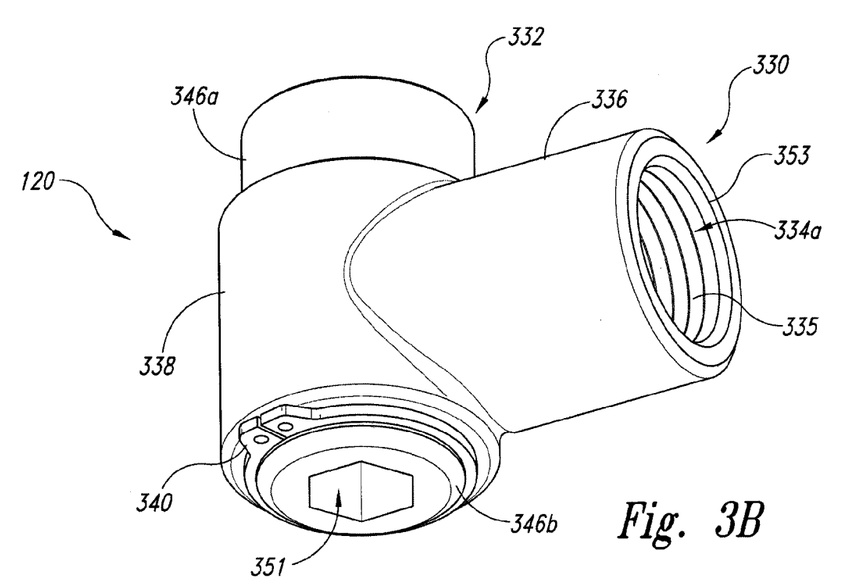
Figure 3C:
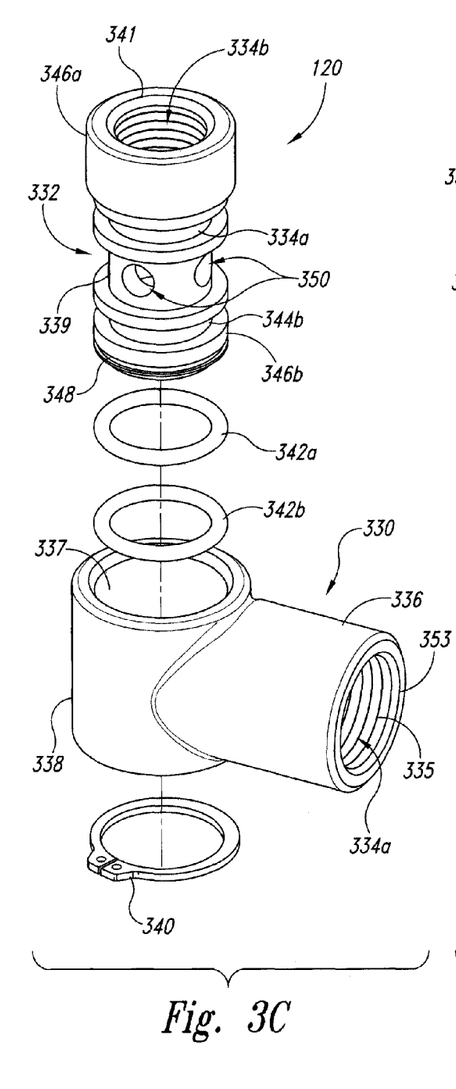
FIGS. 3C and 3D are exploded views of the inflator connector of FIGS. 3A and 3B.
Figure 3D:
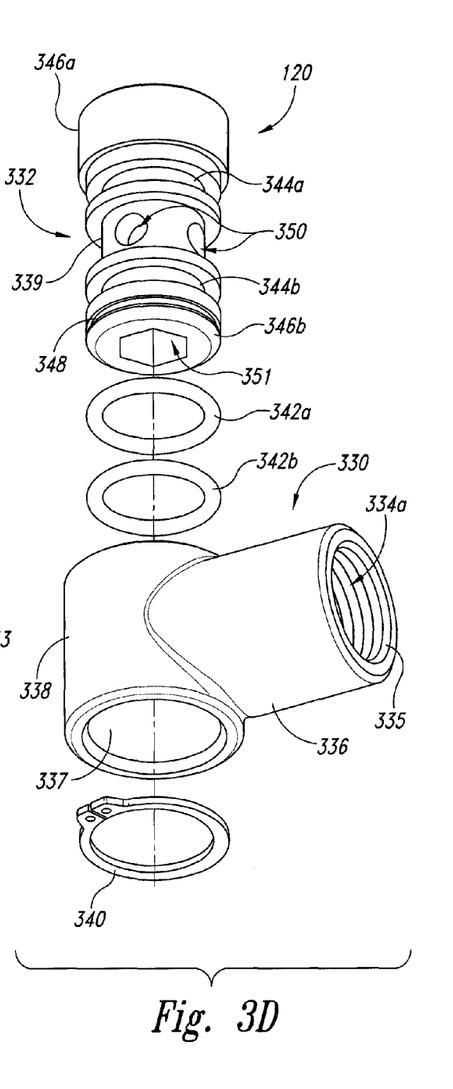
Figure 3E:
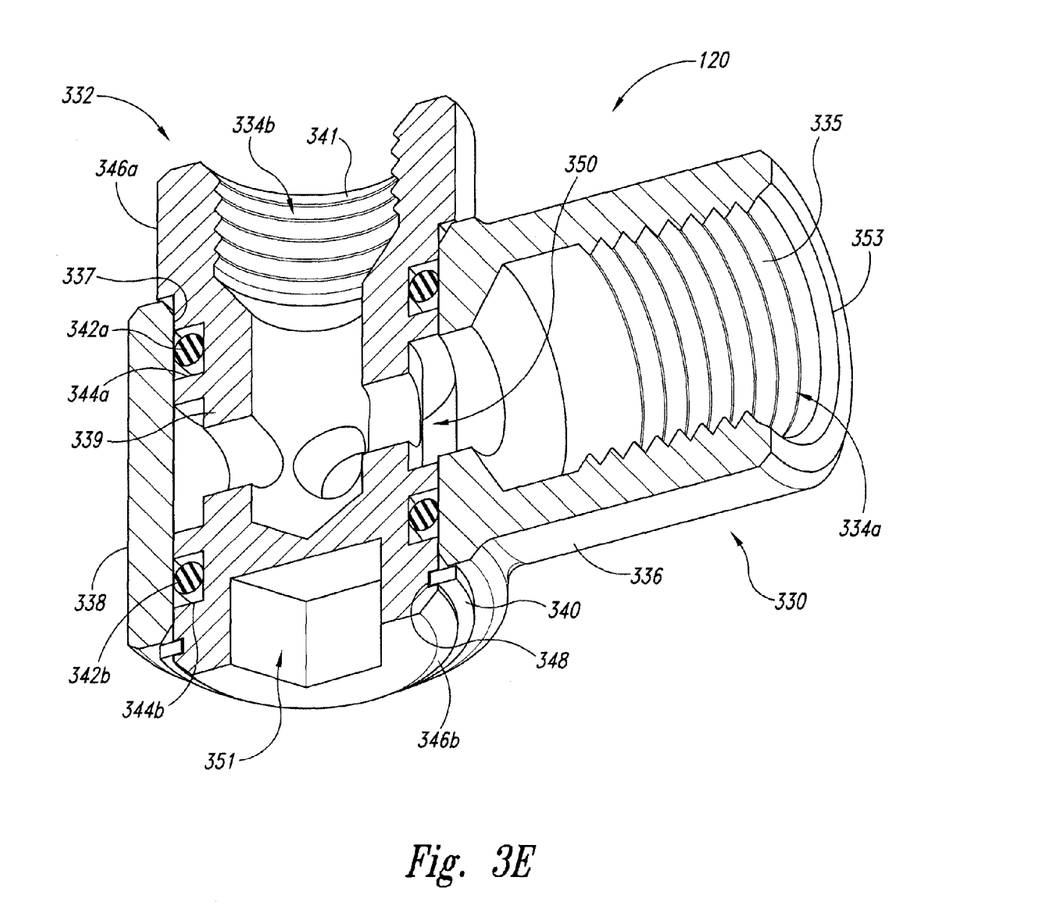
FIG. 3E is a cross-sectional isometric view of the inflator connector of FIGS. 3A and 3B.

FIGS. 3A-3E are enlarged isometric views of the connector 120 of FIGS. 1-2B configured in accordance with an embodiment of the present technology. More specifically, FIGS. 3A and 3B are enlarged isometric views, FIGS. 3C and 3D are exploded isometric views, and FIG. 3E is a cross-sectional isometric view of the connector 120. Referring to FIGS. 3A-3E together, in the illustrated embodiment the connector 120 includes a coupling 332 rotatably received by a body 330. The body 330 can include an attachment portion 336 having a first bore 335 that includes a first engagement feature (e.g., first internal threads 334a) positioned toward a first opening 353. In various embodiments, the first opening 353 can define an inlet that receives a gas outlet of an inflator (e.g., the gas outlet 111 of the inflator 110 shown in FIGS. 1-2B) such that the first engagement feature can releasably engage the gas outlet (e.g., by engaging corresponding threads on the gas outlet 111). In other embodiments, the orientation of the connector 120 can be reversed such that the first opening 353 defines an outlet that receives an end fitting of a gas tube (e.g., the end fitting of the gas tube 114 shown in FIGS. 1 and 2A), and the first engagement feature releasably engages the end fitting of the gas tube (e.g., by engaging corresponding threads on an end fitting of the gas tube 114).

The body 330 can also include a cylindrical socket or sleeve portion 338 having a second bore 337 that intersects the first bore 335 and is in fluid communication with the first bore 335. The second bore 335 receives the coupling 332 and allows rotation between the coupling 332 and the body 330 along the longitudinal axis of the second bore 337. In the illustrated embodiment, the attachment portion 336 and the sleeve portion 338 are oriented at right angles (i.e., 90°) to one another. In other embodiments, however, the attachment portion 336 and the sleeve portion 338 can be oriented at other angles relative to one another if advantageous for a particular application. In one embodiment, for example, the attachment portion 336 and the sleeve portion 338 can be coaxial.

Referring to FIGS. 3C and 3D, the coupling 332 can include a first end portion 346a opposite a second end portion 346b. The coupling 332 can also include a second engagement feature (e.g., second internal threads 334b) positioned toward the first end portion 346a for releasably engaging the gas tube or the inflator.

The coupling 332 can also include one or more through-holes 350 that extend through a sidewall 339 of the coupling 332. As shown in FIG. 3E, when the coupling 332 is received in the sleeve portion 338 of the body 330, the through-holes 350 can be substantially aligned with the first bore 335 to provide passageways through which gas from the first opening 353 can flow into the coupling 332 and out through a second opening 341, or vice versa. In the illustrated embodiment, the coupling 332 has a cylindrical shape, and the through-holes 350 are positioned around a circumference of the coupling 332. These circumferential through-holes 350 allow gas to flow through the connector 120 irrespective of the rotational position of the coupling 332 in relation to the body 330. In other embodiments, the coupling 332 can have other suitable shapes, and/or the through-holes 350 can have other shapes and positions. In further embodiments, the coupling 332 can include other apertures or openings covered with, e.g., nets, screens, etc. that allow gas to flow through the connector 120.

In the illustrated embodiment, the connector 120 couples to the inflator 110 and the gas tube 114 (FIGS. 1-2B) by the threads 334. In other embodiments, however, the connector 120 can include other types of suitable engagement features for coupling to the inflator and/or the gas tube in those situations where the inflator and/or the gas tube have different engagement features. For example, in some embodiments, the connector 120 can include mating surfaces that must be rotationally aligned with corresponding mating surfaces of the gas outlet and gas tube for proper engagement. In further embodiments, the connector 120 can join the gas outlet to the gas tube using other engagement features, such as ball detents, adhesives, etc. Accordingly, the present disclosure is not limited to connectors having internal threads 334, but extends to other connectors having other types of engagement features.

Referring to FIGS. 3A, 3B and 3D, the first end portion 346a of the coupling 332 can protrude beyond the sleeve portion 338 to receive mating threads on the gas tube, and the second end portion 346b can protrude beyond the opposite end of the sleeve portion 338 to facilitate connection between the coupling 332 and the body 330. As shown in FIG. 3E, for example, a retainer clip 340 (e.g., a snap ring, clip, etc.) can mate with a groove in a flange 348 of the second end portion 346b to rotatably secure the coupling 332 to the body 330. The retainer clip 340 can be made from metals, metal alloys, elastomers, and/or other suitable materials known in the art. In other embodiments, other fastening mechanisms can rotatably couple the coupling 332 to the body 330.

In some embodiments, however, the coupling 332 may not protrude through the sleeve portion 338 of the body 330. The first end portion 346a of the coupling 332, for example, can terminate within the sleeve portion 338 such that the gas tube 114 attaches compactly within the sleeve portion 338. As another example, the second end portion 346b can terminate within the sleeve portion 338 such that the coupling 332 and the body 330 are joined internally within the sleeve portion 338.

As shown in FIGS. 3C-3E, the connector 120 can further include one or more sealing features 342 (identified individually as a first sealing feature 342a and a second sealing feature 342b) that are seated in corresponding grooves 344 (identified individually as a first groove 344a and a second groove 344b) in the coupling 332. In the illustrated embodiment, the sealing features 342 are O-rings that have a toroidal shape. One skilled in the art, however, will appreciate that the sealing features 342 can have other cross-sectional shapes corresponding to the shape of the grooves 344, such as square-cuts, lathe cuts, and/or square rings. The sealing features 342 can be made from an elastomeric material (e.g., synthetic rubber, thermoplastic, etc.) and/or other suitable compressible materials known in the art, and can be formed by compression molding, injection molding, and/or other suitable methods known in the art.

As shown in FIG. 3E, the sealing features 342 can be slidably compressed between the coupling 332 and the sleeve portion 338 of the body 330 on both sides of the through-holes 350 to create a seal therebetween, thereby forming a sealed gas passageway between the inflator 110 and the gas tube 114. The sealing features 342 also permit relative rotation between the coupling 332 and the sleeve portion 338. In selected embodiments, lubrication can be added in the grooves 344 to facilitate the rotation of the coupling 332 around the sealing features 342. In other embodiments, the sealing features 342 can include gaskets and/or other suitable devices that seal the body 330 and the coupling 332 together while still maintaining relative motion therebetween.

Referring to FIGS. 3B, 3D and 3E, the coupling 332 can further include a grip feature 351 that can be used to hold the coupling 332 and facilitate installation of the connector 120. In the illustrated embodiment, for example, the grip feature 351 is a hex socket in the second end portion 346b of the coupling 332. The hex socket is configured to receive a corresponding hex key that can be used to rotate the coupling 332 and thread or otherwise connect the coupling 332 to the gas tube or the inflator. In other embodiments, the grip feature 351 can hold the coupling 332 in place to prevent the rotation of the coupling 332 and allow the gas tube or the inflator to be threaded or otherwise attached to the second engagement feature. In further embodiments, the grip feature 351 can be positioned on and/or coupled to other portions of the coupling 332. In other embodiments, the grip feature 351 can include a socket or slot configured to receive screw drivers or other tools, a bolt or other protruding feature configured to be engaged by a wrench or other instruments, and/or other features that can facilitate temporarily restraining the coupling 332 during installation.

The body 330 and the coupling 332 can be made from plastic (e.g., injection molded plastic), metal, and/or other suitable materials known in the art that can withstand the fatigue, pressure, and other forces that arise between the gas outlet and the gas tube during use. The body 330 and the coupling 332 can be formed by molding, casting, machining, extrusion, and/or other suitable manufacturing techniques known in the art. In the illustrated embodiment, the attachment portion 336 and the sleeve portion 338 of the body 330 can be integrally formed. In other embodiments, the attachment portion 336 and the sleeve portion 338 can be formed separately and joined together using suitable techniques known in the art (e.g., bonding, welding, etc.).

The connector 120 can provide a standardized connection between inflators and gas tubes that is easy to install regardless of the thread orientations of mating parts. To install the connector 120 to an inflator, the first threads 334a on the body 330 of the connector 120 can be securely threaded onto the gas outlet. The coupling 332 can then be rotated via a tool inserted into the grip feature 351 to engage the second threads 334b with corresponding threads on the gas tube. Alternatively, the coupling 332 can be rotated to align with corresponding threads on the gas tube and held in place via the grip feature 351 while the end fitting on the gas tube rotates to engage the second threads 334b. This rotation can prevent awkward attachment orientations between the inflator and the gas tube, thereby reducing the likelihood of a failure in the connection therebetween. Additionally, because the inflator does not need to be rotated to attach to the gas tube, the rotatable coupling 332 can also prevent an electrical link (e.g., the electrical link 116 shown in FIG. 1) connected to the inflator electrical port (e.g., the electrical port 113 shown in FIG. 1) from becoming twisted. After forming the connection between the inflator and the gas tube, the gas tube can further rotate about the sleeve portion 338 of the connector 120 to facilitate the connection between the gas tube and an airbag (e.g., the airbag 108 shown in FIG. 1) and/or to accommodate seatbelt movement after installation. Therefore, the connector 120 increases the flexibility of the inflator positioning, eases inflator and gas tube installation, and enhances the gas and electrical connections of the inflator.

In other embodiments, the orientation of the connector 120 is reversed such that the attachment portion 336 of the body 330 engages the gas tube and the coupling 332 engages the inflator. This allows the inflator to rotate relative to the fixedly positioned gas tube. The inflator can rotate, for example, to accommodate the positioning of other features coupled thereto, such as a squib connector.

Figure 4:
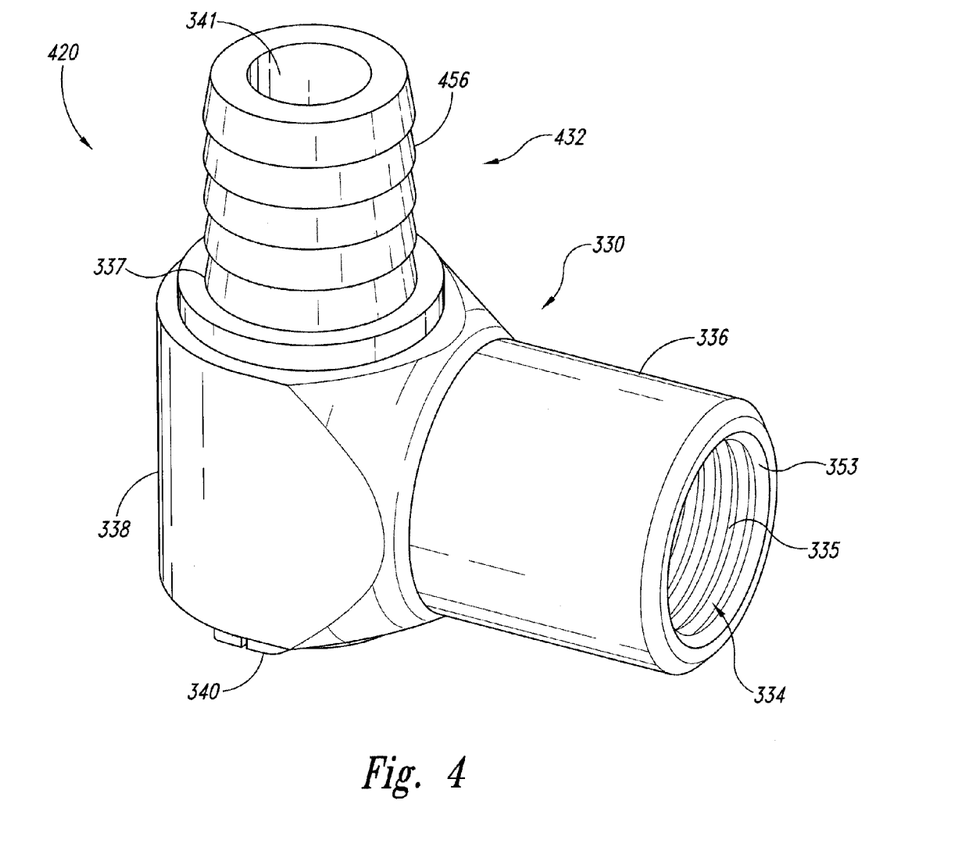
FIG. 4 is an isometric view of an inflator connector configured in accordance with another embodiment of the present technology.

As mentioned above, the connector 120 can be attached to the inflator and the gas tube in various ways. FIG. 4, for example, is an isometric view of an inflator connector ("connector 420") configured in accordance with another embodiment of the present technology. The connector 420 includes features generally similar to those of the connector 120 of FIGS. 1-3E. However, rather than a rotatable coupling with internal threads, the connector 420 includes a rotatable coupling 432 having a barbed boss 456 that can engage an inner portion of the gas tube and/or an inner portion of the inflator.

The gas tube, for example, can include a ferrule (e.g., a hydraulic ferrule), a sleeve, and/or other suitable end fittings that can be crimped or compressed onto to the barbed boss 456. The body 330 of the connector 120 can also include a barbed boss engagement feature. In other embodiments, the coupling 432 and/or the body 330 can include other types of engagement features, such as retaining clips (e.g., e-rings), clasps, snaps, and/or other suitable engagement features. In various embodiments, the engagement features can also include a quick disconnect component to ease detachment of the connector 420 from the gas tube or the inflator (e.g., after the inflator has been deployed).

From the foregoing, it will be appreciated that specific embodiments have been described herein for purposes of illustration, but that modifications may be made without deviating from the spirit and scope of the various embodiments of the disclosure. The connector 120 shown in the Figures, for example, can include additional rotating couplings 332 and corresponding sleeve portions 338 such that multiple gas tubes 114 can be connected to the inflator 110 and/or the inflator 110 and the gas tube 114 can both connect to the rotatable couplings 332. Additionally, specific elements of any of the foregoing embodiments can be combined or substituted for elements in other embodiments. Moreover, the restraint system described above can be incorporated in non-automobile or non-aircraft systems. Certain aspects of the disclosure are accordingly not limited to automobile or aircraft systems. Furthermore, while advantages associated with certain embodiments of the disclosure have been described in the context of these embodiments, other embodiments may also exhibit such advantages, and not all embodiments need necessarily exhibit such advantages to fall within the scope of the technology. Accordingly, the disclosure is not limited except as by the appended claims.

I claim:

1. A connector for operably coupling an airbag inflator to a gas tube, the connector comprising:
    a body having an attachment portion and a sleeve portion, the attachment portion having a first bore, the sleeve portion having a second bore in fluid communication with the first bore, wherein the first bore includes a first engagement feature positioned toward a first opening for operably engaging at least one of the inflator and the gas tube;
    a coupling rotatably received in the second bore of the sleeve portion, the coupling having a second engagement feature positioned toward a second opening for operably engaging the other of the inflator and the gas tube, wherein the second opening is in fluid communication with the first opening, and wherein the coupling includes a first groove proximate to a first end portion of the coupling and a second groove proximate to a second end portion of the coupling; and
    a first sealing ring received in the first groove and a second sealing ring received in the second groove, wherein the first and second sealing rings are configured to form a seal between the sleeve portion and the coupling.

2. The connector of claim 1 wherein at least one of the first engagement feature and the second engagement feature includes at least one of threads and a barbed boss.

3. The connector of claim 1 wherein:
    the first engagement feature is configured to releasably engage a gas outlet of the inflator; and
    the second engagement feature is configured to releasably engage the gas tube.

4. The connector of claim 1 wherein the coupling includes at least one through-hole extending through a sidewall of the coupling, and wherein the first bore and the through-hole are in fluid communication with one another.

5. The connector of claim 1 wherein:
    the first engagement feature includes threads;
    the second engagement feature includes a barbed boss; and
    the coupling includes a plurality of through-holes positioned around a sidewall of the coupling between the first and second grooves, wherein the through-holes and the first bore are in fluid communication with one another.

6. A connector for operably coupling an airbag inflator to a gas tube, the connector comprising:
    a body having an attachment portion and a sleeve portion, the attachment portion having a first bore, the sleeve portion having a second bore in fluid communication with the first bore, wherein the first bore includes a first engagement feature positioned toward a first opening for operably engaging at least one of the inflator and the gas tube;
    a coupling rotatably received in the second bore of the sleeve portion, the coupling having a second engagement feature positioned toward a second opening for operably engaging the other of the inflator and the gas tube, wherein the second opening is in fluid communication with the first opening, and wherein the coupling includes an end portion having a groove, wherein the end portion protrudes beyond the second bore; and
    a retainer clip mated with the groove.

7. The connector of claim 6 wherein the coupling further includes a grip feature configured to releasably engage a tool for rotating the coupling.

8. An airbag inflator system, comprising:
    an inflator having a gas outlet, wherein the gas outlet includes inflator threads;
    a gas tube having an inlet, wherein the gas tube includes tube threads; and
    an inflator connector comprising a coupling rotatably coupled to a body, wherein the body is configured to connect to at least one of the inflator outlet and the gas tube inlet, wherein the coupling is configured to connect to the other of the inflator gas outlet and the gas tube inlet, wherein the body includes first threads at an inlet opening of the body, the first threads being configured to engage the inflator threads, and wherein the coupling includes second threads at an outlet opening of the coupling, the second threads being configured to engage the tube threads.

9. An airbag inflator system, comprising:
    an inflator having a gas outlet;
    a gas tube having an inlet; and
    an inflator connector comprising a coupling rotatably coupled to a body, wherein the body is configured to connect to at least one of the inflator outlet and the gas tube inlet, wherein the coupling is configured to connect to the other of the inflator gas outlet and the gas tube inlet, and wherein the coupling includes at least one through-hole positioned around a sidewall of the coupling.

10. The airbag inflator system of claim 9 wherein the inflator connector further comprises a sealing feature configured to form a seal between the body and the coupling.

11. The airbag inflator system of claim 9 wherein:
    the body includes a first bore and a second bore in fluid connection with one another;
    the coupling is received in the second bore, the coupling having an end portion protruding beyond the second bore, wherein the end portion includes a groove; and the inflator connector further includes a retainer clip seated in the groove.

12. The airbag inflator system of claim 9 wherein the inflator connector further comprises a grip feature configured to releasably couple to a tool that rotates the coupling.

13. An airbag inflator system, comprising:
   an inflator having a gas outlet;
   a gas tube having an inlet; and
   an inflator connector comprising a coupling rotatably coupled to a body, wherein the body is configured to connect to at least one of the inflator outlet and the gas tube inlet, wherein the coupling is configured to connect to the other of the inflator gas outlet and the gas tube inlet, and wherein the coupling includes a barbed boss configured to connect to at least one of the inflator outlet and the gas tube inlet.

14. A method of manufacturing an inflator connector, the method comprising:
   forming a body having a first bore in fluid communication with a second bore, the first bore having a first opening;
   forming a first engagement feature toward the first opening;
   forming a coupling having a second opening;
   forming a second engagement feature toward the second opening;
   inserting the coupling into the second bore, the coupling being configured to rotate about a longitudinal axis of the second bore, wherein the second opening is in fluid communication with the first opening; and
   forming at least one through-hole around a sidewall of the coupling, wherein the through-hole is in fluid communication with the first opening.

15. The method of claim 14 wherein:
   inserting the coupling in the second bore further comprises projecting an end portion of the coupling beyond the second bore; and
   the method further includes mating a retainer clip with a groove in the end portion of the coupling.

16. The method of claim 14, further comprising forming a seal between the body and the coupling.

17. The method of claim 14 wherein forming the coupling includes forming a grip feature on an end portion of the coupling, the grip feature being configured to releasably engage a tool that rotates the coupling.

18. A method of manufacturing an inflator connector, the method comprising:
   forming a body having a first bore in fluid communication with a second bore, the first bore having a first opening;
   forming a first engagement feature toward the first opening;
   forming a coupling having a second opening;
   forming a second engagement feature toward the second opening;
   inserting the coupling into the second bore, the coupling being configured to rotate about a longitudinal axis of the second bore, wherein the second opening is in fluid communication with the first opening;
   forming the first engagement feature comprises forming first threads in an internal sidewall of the first bore, wherein the first threads are configured to engage threads on a gas outlet of an inflator; and
   forming the second engagement feature comprises forming second threads in an internal sidewall of the coupling, wherein the second threads are configured to engage threads on an end fitting of a gas tube.

19. A method of manufacturing an inflator connector, the method comprising:
   forming a body having a first bore in fluid communication with a second bore, the first bore having a first opening;
   forming a first engagement feature toward the first opening;
   forming a coupling having a second opening;
   forming a second engagement feature toward the second opening, wherein forming at least one of the first and second engagement features comprises forming a barbed boss configured to engage at least one of a gas outlet of an inflator and an end fitting of a gas tube; and
   inserting the coupling into the second bore, the coupling being configured to rotate about a longitudinal axis of the second bore, wherein the second opening is in fluid communication with the first opening.

* * * * *